(12) United States Patent
Pmsvvsv et al.

(10) Patent No.: US 11,990,790 B2
(45) Date of Patent: May 21, 2024

(54) MICROGRID INCLUDING DUAL MODE MICROGRID INVERTER AND LOAD MANAGEMENT METHOD

(71) Applicant: BLOOM ENERGY CORPORATION, San Jose, CA (US)

(72) Inventors: Prasad Pmsvvsv, Sunnyvale, CA (US); Mehdi Ebad, San Jose, CA (US); Ranganathan Gurunathan, Bangalore (IN); Vishal Anand Gopalakrishnan, Bangalore (IN); Jayanth Moodliar, Bangalore (IN); Saravana Narayanasamy, Bangalore (IN); Rakesh Kumar Roy, Bangalore (IN); Deepak Balakrishnan, Bangalore (IN)

(73) Assignee: BLOOM ENERGY CORPORATION, San Jose, CA (US)

( * ) Notice: Subject to any disclaimer, the term of this patent is extended or adjusted under 35 U.S.C. 154(b) by 265 days.

(21) Appl. No.: 17/686,877

(22) Filed: Mar. 4, 2022

(65) Prior Publication Data
US 2022/0285977 A1 Sep. 8, 2022

Related U.S. Application Data

(60) Provisional application No. 63/158,147, filed on Mar. 8, 2021.

(51) Int. Cl.
*H02M 7/44* (2006.01)
*H02J 3/38* (2006.01)
*H02J 9/06* (2006.01)

(52) U.S. Cl.
CPC .............. *H02J 9/062* (2013.01); *H02J 3/381* (2013.01); *H02J 3/388* (2020.01); *H02M 7/44* (2013.01);
(Continued)

(58) Field of Classification Search
CPC .. H02J 9/062; H02J 3/388; H02J 3/381; H02J 2300/30; H02M 7/44; H01M 2250/10
See application file for complete search history.

(56) References Cited

U.S. PATENT DOCUMENTS 11,258,294 B2    2/2022  Pmsvvsv et al.
11,387,476 B2 *  7/2022  Pmsvvsv .......... H01M 8/04302
(Continued)

FOREIGN PATENT DOCUMENTS

KR    10-2018-0128849    12/2018
WO    WO2017/044196      3/2017

OTHER PUBLICATIONS

Office Communication, Extended European Search Report for European Patent Application No. 22159333, dated Jul. 28, 2022, 11 pages.
(Continued)

*Primary Examiner* — Adolf D Berhane
(74) *Attorney, Agent, or Firm* — THE MARBURY LAW GROUP PLLC (57) ABSTRACT

A microgrid includes a power system configured to output system power and an automatic transfer switch (ATS). The ATS includes a normal terminal that is electrically connected to a grid power line configured to receive grid power from a power utility, an emergency terminal that is electrically connected to a system power line configured to receive system power from the power system, and a load terminal that is electrically connected to a critical load line configured to provide power to a critical load. The microgrid also includes a bypass line electrically connected to the system power line and the critical load line, so as to bypass the ATS, and a circuit breaker configured to control power flow through the bypass line.

20 Claims, 10 Drawing Sheets

(52) U.S. Cl.
CPC ...... *H01M 2250/10* (2013.01); *H02J 2300/30* (2020.01)

(56) References Cited

U.S. PATENT DOCUMENTS

| | | |
|---|---|---|
| 2004/0046458 A1 | 3/2004 | MacKay |
| 2014/0009003 A1 | 1/2014 | Ballantine et al. |
| 2015/0288220 A1 | 10/2015 | Gurunathan et al. |
| 2016/0036236 A1 | 2/2016 | Teichmann |
| 2017/0005480 A1 | 1/2017 | Ballantine et al. |
| 2017/0070087 A1 | 3/2017 | Oliver et al. |
| 2017/0338502 A1 | 11/2017 | Pmsvvsv et al. |
| 2019/0052094 A1 | 2/2019 | Pmsvvsv et al. |
| 2019/0229535 A1 | 7/2019 | Pmsvvsv et al. |
| 2019/0245216 A1 | 8/2019 | Liao et al. |
| 2019/0312432 A1 | 10/2019 | Gurunathan et al. |
| 2019/0312441 A1 | 10/2019 | Ballantine et al. |
| 2020/0020964 A1 | 1/2020 | Pmsvvsv et al. |
| 2020/0076200 A1 | 3/2020 | Ballantine et al. |
| 2020/0212459 A1 | 7/2020 | Ballantine et al. |
| 2020/0266658 A1 | 8/2020 | Cottuli et al. |
| 2021/0152016 A1 | 5/2021 | Pmsvvsv et al. |
| 2021/0257638 A1 | 8/2021 | Pmsvvsv et al. |
| 2021/0267952 A1 | 9/2021 | Holmes et al. |
| 2021/0359623 A1 | 11/2021 | Pmsvvsv et al. |

OTHER PUBLICATIONS

Notification of Transmittal of the International Search Report and the Written Opinion of the International Searching Authority for International Patent Application No. PCTUS2021/018150, dated Jun. 9, 2021, 8 pages.

* cited by examiner

MICROGRID INCLUDING DUAL MODE MICROGRID INVERTER AND LOAD MANAGEMENT METHOD

FIELD

The present disclosure is directed a microgrids in general, and in particular to a microgrid including a fuel cell system and a dual mode inverter, and method of load management utilizing the microgrid.

BACKGROUND

A microgrid is a group of interconnected loads and distributed energy resources within clearly defined electrical boundaries that acts as a single controllable entity with respect to the main power grid. For example, a microgrid may include a local power generator, a load, a load management controller, a grid isolation switch, and a switch controller.

A microgrid can operate in a grid mode where the microgrid is electrically connected to the main power grid, and can operate in an island mode where the microgrid is disconnected from the main power grid and the microgrid is powered by the local power generator only. In grid mode, the power grid may operate as a buffer (slack bus) to provide or absorb power differences between local generation and loads in microgrid.

SUMMARY

According various embodiments, a microgrid includes a power system configured to output system power and an automatic transfer switch (ATS). The ATS includes a normal terminal that is electrically connected to a grid power line configured to receive grid power from a power utility, an emergency terminal that is electrically connected to a system power line configured to receive system power from the power system, and a load terminal that is electrically connected to a critical load line configured to provide power to a critical load. The microgrid also includes a bypass line electrically connected to the system power line and the critical load line, so as to bypass the ATS, and a circuit breaker configured to control power flow through the bypass line.

According various embodiments, a method includes sequentially operating a microgrid in a grid parallel mode and in an island mode. During the grid parallel mode, the method includes providing grid power to a non-critical load via a grid power line electrically connected to the non-critical load, and to a critical load via the grid power line, a critical load line electrically connected to the critical load, and an automatic transfer switch (ATS) electrically connected to the grid power line and the critical load power line, and providing system power generated by a power system to the critical load via a system power line, the critical load line, and a bypass line that is electrically connected to the system power line and the critical power line, in parallel to the ATS. During the island mode, the method includes providing the system power to the critical load via the system power line, the ATS, and the critical load power line, such that the system power is not provided to the non-critical load.

BRIEF DESCRIPTION OF THE DRAWINGS

The accompanying drawings, which are incorporated herein and constitute part of this specification, illustrate examples of the disclosed devices and methods, and together with the general description given above and the detailed description given below, serve to explain the features of the invention.

DETAILED DESCRIPTION

The various examples will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims. It is also understood that the examples shown in the figures are not mutually exclusive. Features shown in one example (e.g., in one figure) may be included in other examples (e.g., in other figures).

A fuel cell system is a type of distributed power source that may be utilized to provide power to one or more loads, such as essential and non-essential loads of a microgrid. When such a microgrid is connected to a main power grid, power in excess of that required by microgrid loads may be supplied to the power grid. In addition, power from the power grid may be utilized to operate fuel cell system balance of plant (BOP) elements during fuel cell system startup.

For example, fuel cell power generation systems, such as solid oxide fuel cell (SOFC) based distributed power generation systems, may have relatively high operating temperatures, such as temperatures of 750° C. and above for SOFCs, during a steady-state power generation mode. Accordingly, during system startup, such systems are generally provided with power from an external source, such as a connected utility or other external AC generator, in order to power BOP elements (e.g., fans, blowers, switches, etc.) and/or parasitic loads. This external startup power may be provided by converting the externally provided AC voltage to a DC voltage that is usable by the converters powering the BOP elements and other parasitic loads.

Figure 1A:
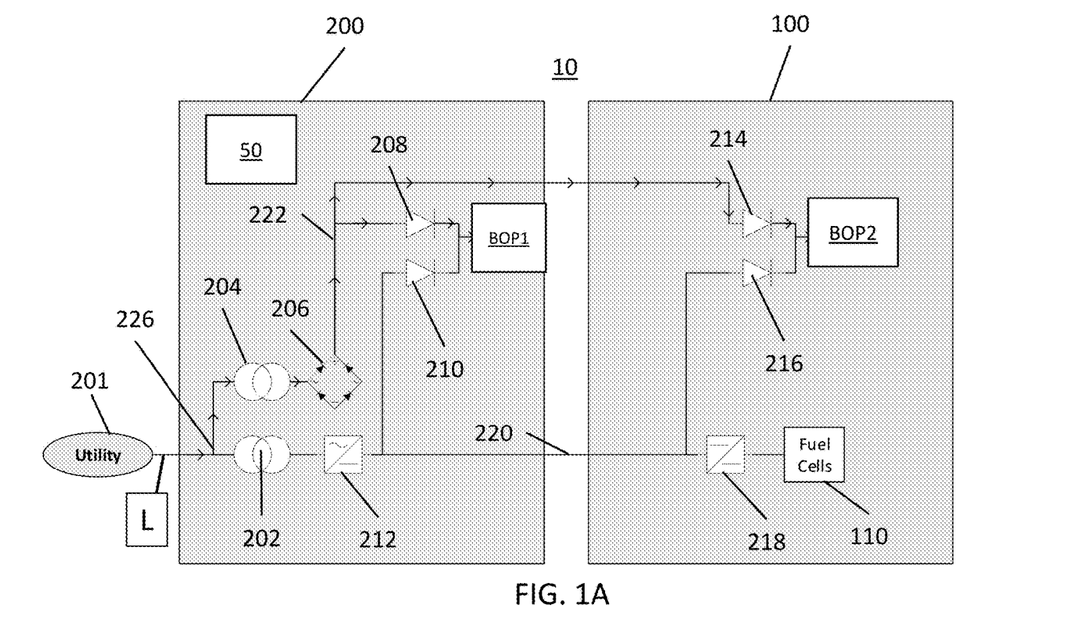
FIG. 1A is a schematic illustrating power flow through electrical architecture of a fuel cell system during system startup.
Figure 1B:
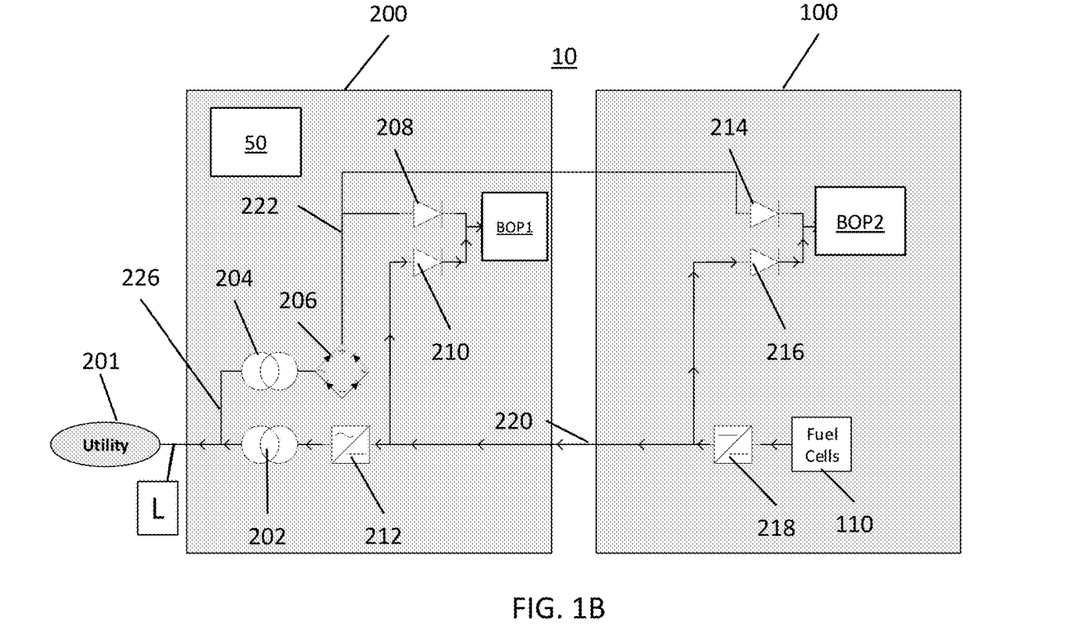
FIG. 1B is a schematic illustrating power flow through the fuel cell system electrical architecture during steady-state operation, according to embodiments of the present disclosure.

FIG. 1A is a schematic illustrating power flow through electrical architecture of a fuel cell system 10 during system startup, and FIG. 1B is a schematic illustrating power flow through the fuel cell system electrical architecture during steady-state operation, according to a comparative example of the present disclosure. As would be apparent to one of ordinary skill in the art, the component "connections" described below are intended to refer to "electrical connections" unless otherwise specified.

Referring to FIGS. 1A and 1B, the system 10 may include an inverter module 200 and at least one power module 100 including fuel cells 110. The fuel cells 110 may be arranged in one or more stacks or columns. The fuel cells 110 may include solid oxide fuel cells having a ceramic oxide electrolyte separated by conductive interconnect plates. Other fuel cell types, such as proton exchange membrane (PEM), molten carbonate, phosphoric acid, etc. may be used. The power module 100 may be connected to the inverter module 200 by a startup bus and a fuel cell (e.g., steady state) bus, as described below. In some embodiments, the system 10 may include multiple inverter modules 200 that are each connected to multiple power modules 100.

The system 10 may include a controller 50 configured to control the operations of the inverter module 200 and/or the power module 100. The controller 50 may be disposed in, or operatively connected to, the inverter module 200 or the power module 100. The controller 50 may include a central processing unit and/or a memory configured to store operating software. In some embodiments, the controller 50 may provide an interface to allow an operator to control the system 10.

The controller 50 may be implemented using computing devices (such as computer) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions. The processor may include a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The inverter module 200 may include a steady-state transformer 202 and a startup transformer 204 that are connected to an external power source, such as an electrical utility 201 (e.g., power grid or external power generator) by an external power source bus 226. The steady-state transformer 202 may be connected to an AC/DC inverter 212. The inverter 212 may be connected to a steady-state diode 210 that is connected to a first balance-of-plant load BOP1. The startup transformer 204 may be connected to a rectifier 206. The rectifier 206 may be connected via the startup bus 222 to a startup diode 208 connected to the load BOP1.

The power module 100 may include a DC/DC converter 218, a startup diode 214, and a steady-state diode 216. The DC/DC converter 218 may be electrically connected to the inverter 212 and fuel cells 110 of the power module 100. The DC/DC converter 218 may also be connected to the steady-state diode 216. The diodes 214, 216 may be connected to a second balance-of-plant load BOP2. The startup diode 214 may be electrically connected to the rectifier 206.

Referring to FIG. 1A, during startup of the system 10, before the fuel cells 110 reach the steady-state operating temperature (e.g., at least 750° C., such as 750° C. to 900° C. for SOFCs), the fuel cells 110 may not generate an amount of power sufficient for the BOP loads. As such, during startup, the power from the utility is provided to the loads BOP1, BOP2, via the startup bus 222. In particular, power flows via the startup bus 222 through the startup transformer 204, the rectifier 206, the startup diodes 208, 214, and then to the BOP loads BOP1, BOP2. The inverter 212, converter 218 and steady-state bus 220 are not used during system startup.

Referring to FIG. 1B, once the fuel cells reach the desired steady-state operating temperature (e.g., 750° C. and above), steady-state operation of the system 10 begins and power is provided from the fuel cells 110 to the loads BOP1, BOP2. In particular, power flows from the fuel cells 110 via the steady-state bus 220 through the DC/DC converter 218, the inverter 212, and through the steady-state transformer 202 to the utility and/or to any local load. Power is also diverted to loads BOP1, BOP2 as needed through the steady-state diodes 210, 216. As such, the rectifier 206 and startup transformer 204 are not used. Steady-state mode operation continues at all times when the fuel cells 110 are hot enough to generate power, which accounts for almost all of the fuel cell's operational life. This includes periods when the transformers 202, 204 are disconnected from the utility 201 (e.g., power grid) during which the steady-state transformer 202 provides power from the fuel cells 110 to a local load "L" instead of to the power grid.

Accordingly, the transformer 204, rectifier 206, fuses (not shown), and wiring used for power conversion during startup are not used during steady-state operation, which represents most of the life cycle of the system 10. As such, this architecture increases the cost of the system 10 and decreases the energy density of the system 10. The rectifier 206 may also produce harmonic currents during startup.

Figure 2A:
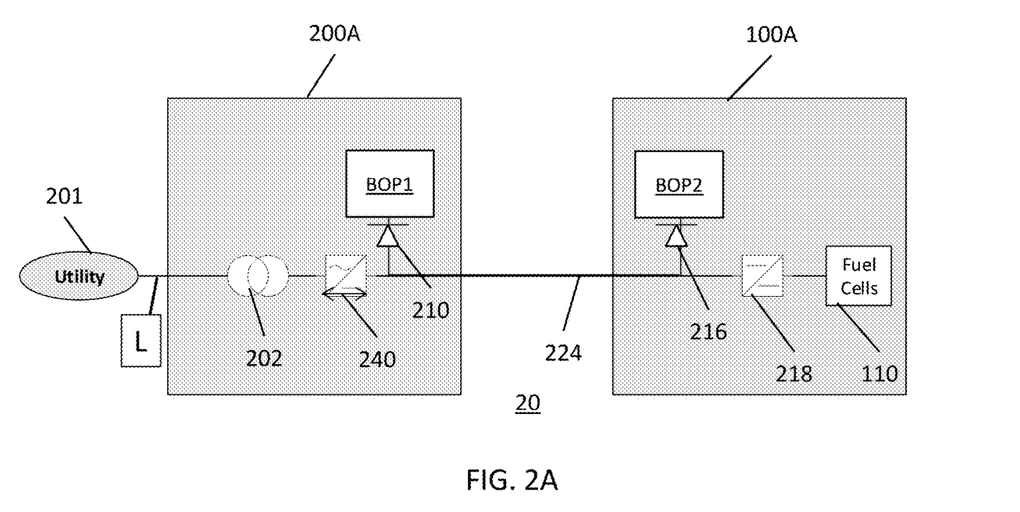
FIGS. 2A and 2B are schematics illustrating electrical architecture of fuel cell systems, according to other embodiments of the present disclosure.

FIG. 2A is a schematic illustrating electrical architecture of a fuel cell system 20 according to another comparative embodiment of the present disclosure. The electrical architecture of the system 20 is similar to the electrical architecture of the system 10 shown in FIGS. 1A and 1B, so only differences there between will be discussed in detail.

Referring to FIG. 2A, the system 20 includes a power module 100A and an inverter module 200A electrically connected by a combination bus 224. The inverter module 200A includes a bidirectional inverter 240 that is electrically connected to the combination bus 224. The bidirectional inverter 240 can convert AC power provided from a utility into DC power suitable for driving the loads BOP1, BOP2 during system startup, and can convert DC power from the fuel cells 110 into AC power that may be provided to the utility during steady-state operation. In other words, the combination bus 224 can be used to transmit power during both steady-state and startup operation. As such, the startup bus 222, the startup transformer 204, the rectifier 206, and the startup diodes 208, 214, of the system 10 of FIGS. 1A and 1B may be omitted from the system 20, without loss of functionality during startup.

Figure 2B:
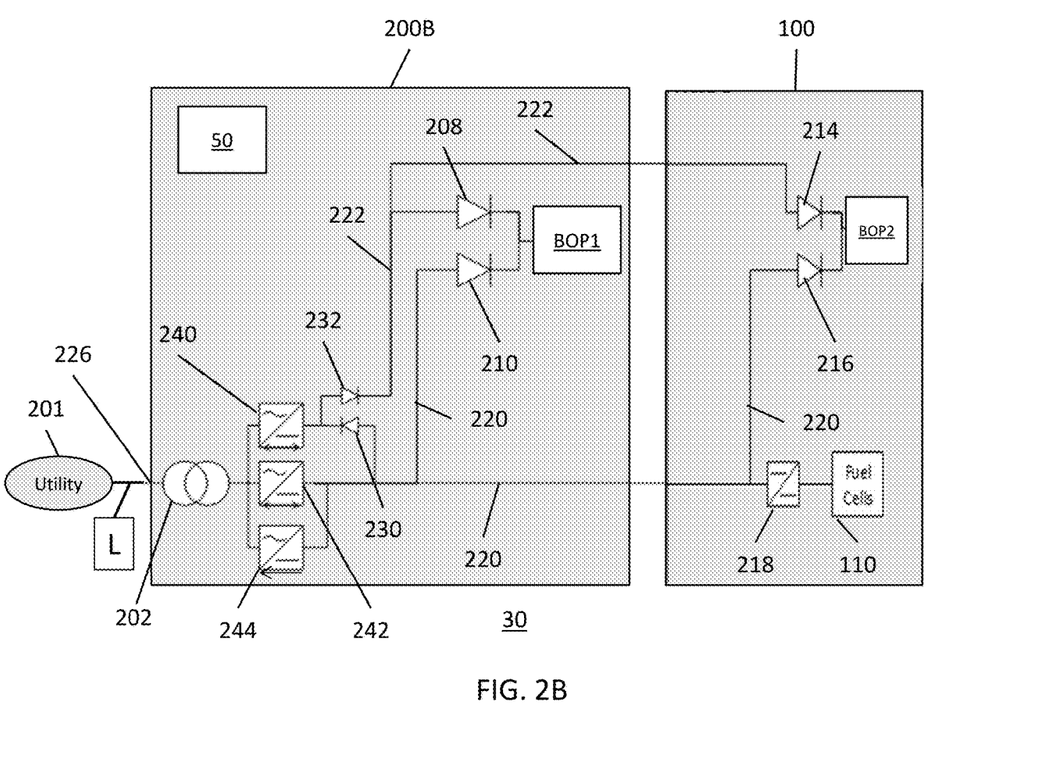

FIG. 2B is a schematic illustrating electrical architecture of a fuel cell system 30, according to various embodiments of the present disclosure. The electrical architecture of the system 30 is similar to the electrical architecture of the system 10 shown in FIGS. 1A and 1B, so only differences there between will be discussed in detail. Referring to FIG. 2B, the system 30 includes the power module 100 and an inverter module 200B, which are electrically connected by the steady-state bus 220 and the startup bus 222. While one power module 100 is shown, the system 30 may include multiple power modules 100 electrically connected to the inverter module 200B. The system 30 may also include a controller 50 configured to control steady-state and startup operations of the system 30.

The inverter module 200B may include a first bidirectional inverter 240, a second bidirectional inverter 242, and at least one mono-directional third inverter 244 (e.g., one to ten mono-directional inverters), which may be electrically connected to a power utility (e.g., a power source external to the system 30) and the system transformer 202 by the external power source bus 226. The inverter module 200B contains a single system transformer 202 which operates in both startup and steady-state modes, instead of the two transformers 202, 204 shown in FIGS. 1A and 1B. The inverter module 200B may also include a startup diode 208 and a steady-state diode 210, which are electrically connected to a first balance-of-plant load BOP1. The inverter module 200B may also include a fault diode 230 and an optional auxiliary diode 232.

The power module 100 may include the startup diode 214 that is electrically connected to the startup bus 222, and the steady-state diode 216 that is electrically connected to the steady-state bus 220. Both diodes 214, 216 control current flow to the second load BOP2.

During startup mode, the external power source bus 226 may provide power from the utility 201 sequentially to the system transformer 302 and the first inverter 240. The transformer 202 may operate to change the voltage of the utility power, and the first inverter 240 may operate to convert the AC utility power (i.e., alternating current) into a DC power (i.e., direct current). The startup bus 222 may then provide the utility power to the first load BOP1, via the startup diode 208. According, the first inverter 240 may operate as a rectifier and the separate rectifier 206 and the startup transformer 204 shown in FIG. 1A may be omitted to decrease the cost of the system 30. Thus, the system 30 may exclude any additional transformers (other than the single system transformer 202) and any rectifiers. The startup bus 222 may also provide the utility 201 power to the second load BOP2 via the startup diode 214. The fault diode 230 prevents current from flowing into through the steady-state bus 220 into the fuel cells 110 during the start-up mode. The second inverter 242 may remain off, such that power does not pass through the second inverter 242 to the steady-state bus 220. Further, since the third inverter 244 is unidirectional, the third inverter 244 may also prevent power from being supplied to the steady-state bus 220, during startup. Accordingly, during system startup, the inverter module 200B may be configured to supply utility power to both loads BOP1, BOP2 via the startup bus 222.

Microgrid Inverter and Load Management

Microgrid island formation due to grid failure is generally detected through a standard protection relay, such as an SEL 751 or Beckwith relay, which monitors voltage (V) and frequency (F) of grid. Apart from V and F monitoring, these protection relays also monitor power following in either direction between the power grid and the microgrid, to detect islanding and open a grid isolation device. However, when a microgrid designed to export excess power to the power grid due excess power generation in microgrid, the reverse power method of islanding detection doesn't work. Therefore, all the generators in the microgrid may be required to have expensive UL certified active anti-islanding protection.

A microgrid generally includes a load management controller that operates to ensure the total load on the microgrid is less than available total generation at all times. When a sufficient power storage buffer is available in the microgrid, a microgrid controller will be able to detect excess demand by monitoring storage output power and shed the load accordingly. However, if sufficient power storage is not available, a microgrid load management controller should operate to shed the load after a power grid failure and before local generation begins supporting local microgrid loads. Load shedding may involve several challenges and several single point failures.

Figure 3A:
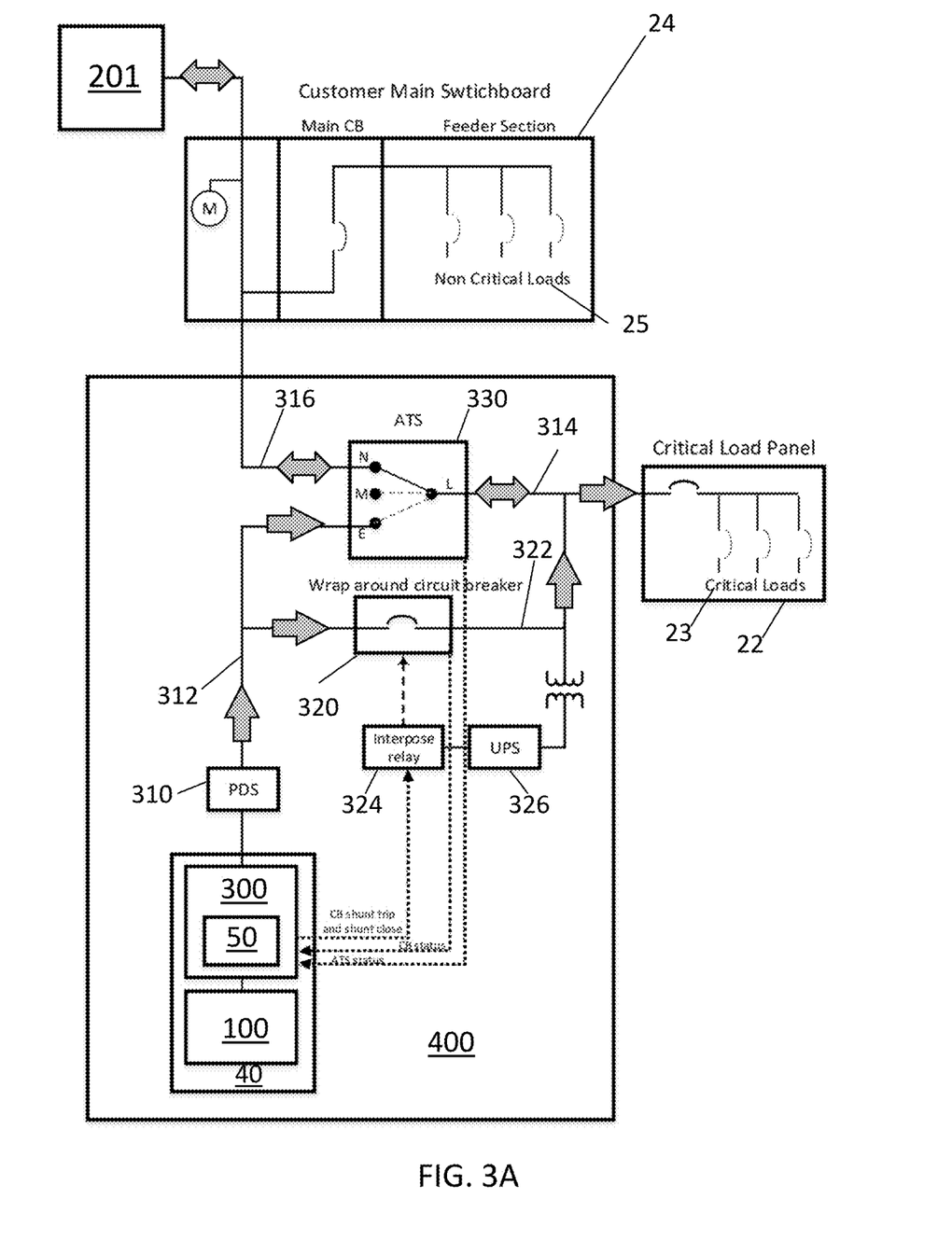
FIG. 3A is a schematic of a microgrid, according to various embodiments of the present disclosure.

FIG. 3A is a schematic of a microgrid 400, according to various embodiments of the present disclosure. FIGS. 3B-3H are schematics showing power flow through the microgrid 400 as the microgrid 400 transitions between a grid mode and an island mode.

Referring to FIG. 3A, the microgrid 400 may include a power system 40, a power distribution system (PDS) 310, a circuit breaker 320, and an automatic transfer switch (ATS) 330. The PDS 310 may include an additional conventional circuit breaker. The circuit breaker 320 may be a wrap-around circuit breaker described in more detail below. The power system 40 may include least one power module 100 and an inverter module 300. In one embodiment, the power system 40 may include plural power modules 100 and plural inverter modules 300 connected to the same PDS 310. The power module 100 may include a fuel cell stack, such as an SOFC stack.

The ATS 330 may include a normal terminal N, an emergency terminal E, a load terminal L, and an optional floating middle terminal or position M. The ATS 330 may switch between a normal position, where the ATS 330 electrically connects the normal terminal N to the load terminal L, an open position where the ATS 330 does not electrically connect the load terminal L to the normal terminal N or the emergency terminal E, and an emergency position where the ATS 330 connects the emergency terminal E to the load terminal L. Alternatively, the ATS 330 may be a two position rather than a three position ATS. The ATS 330 may be contactor based, circuit breaker based or molded case switch based ATS 330 depending on the system requirements.

The power module 100, inverter module 300, and PDS 310 may be electrically connected to the emergency terminal E of the ATS 330 by a system power line 312 (e.g., a local power line). The load terminal L of may be connected to a critical load panel 22 including one or more critical loads 23 by a critical load line 314. The normal source terminal N may be connected to a utility power grid 201 by a grid power line 316. The grid power line 316 may be electrically connected to a main panel (i.e., main load switchboard or panel) 24 including one or more non-critical loads 25.

A bypass line 322 may electrically connect the system power line 312 and the critical load line 314, while bypassing the ATS 330. The circuit breaker 320 may be located on the bypass line 322 and configured to control power flow through the bypass line 322. The circuit breaker 320 may be an electrically operated circuit breaker, contactor, relay, or semiconductor switch, depending on the current rating of the ATS 330. In some embodiments, the microgrid 400 may include an uninterruptable power supply (UPS) 326, and an interpose relay 324 to operate the circuit breaker 320.

The inverter module 300 may be similar to any of the inverter modules 200, 200A, or 200B, of FIGS. 1A-2B. For example, the inverter module 300 may include a controller 50, a transformer 202 electrically connected to the system power line 312, at least one inverter, such as bidirectional first and second inverters 240, 242 electrically connected to the transformer 202, a fault diode 230 electrically connected to the first inverter 240, a first balance of plant (BOP) load BOP1, a steady-state bus 222 electrically connecting the first and second inverters 240, 242 to the first BOP load and a second BOP load BOP2 of the power module 100, and a startup bus 220 electrically connecting the first and second inverters 240, 242 to the first BOP load BOP1 and the second BOP load BOP2. Alternatively, the at least one inverter may include one or more one directional inverters.

The controller 50 of the inverter module 300 may be configured to monitor the connection status of circuit breaker 320 via data connection path "CB Status", a connection status of the ATS 330 via data connection path "ATS Status", and the condition of the grid power (e.g., voltage and/or frequency of the grid power). The data connections may be wired or wireless connections. For example, the inverter module 300 may be electrically connected to and/or configured to monitor current flow through the circuit breaker 320 and/or the ATS 330. The inverter module 300 may also be configured to control power output to the system power line 312 and the operation of the circuit breaker 320 (e.g., via the interpose relay 324 powered by the UPS 322), based on the condition of the power grid 201, the connection status of the circuit breaker 320, and/or the connection status of the ATS 330.

As shown in FIG. 3A, when the microgrid 400 is operating in a grid parallel mode, the ATS 330 may be set in the normal position to electrically connect the grid power line 316 to the critical load line 314. In particular, the ATS 330 may electrically connect the normal terminal N to the load terminal L. The circuit breaker 320 may be closed, such that the bypass line 322 electrically connects the system power line 312 to the critical load line 314. DC power generated by the power module 100 may be output as AC power from the inverter module 300 at a grid-mode voltage and supplied to the critical loads 23, via the system power line 312, the bypass line 322, and the critical load line 314. Excess generated power not required by the critical loads 23 may be supplied to the non-critical loads 25 and/or the power grid 201 via the ATS 330 and grid power line 316. For example, the voltage output by the inverter module 300 may be synchronized with a voltage requirement of the critical loads 23 and/or may be synchronized with a voltage of the grid 201. If the power demand of the critical loads 23 exceeds the power output of the power module 100, then additional power may be supplied to the critical loads 23 from the power grid 201 through the ATS 330 to satisfy the load demand of the critical loads 23. If the power demand of the non-critical loads 25 exceeds the power output of the power module 100, then additional power may be supplied to the non-critical loads 25 from the power grid 201 through the grid power line 316 to satisfy the load demand of the non-critical loads 25.

The inverter module 300 may monitor the grid power on the load side of the ATS 330, in order to determine whether the grid power is suitable for interconnection with the power system 40. For example, the inverter module 300 may constantly or periodically monitor the grid power to determine whether it is in compliance with power utility, IEEE 1547, and/or UL 1741 standards. The inverter module 300 may constantly or periodically monitor current flow through the circuit breaker 320 and/or the ATS 330, in order to monitor the connection status thereof. In addition, the ATS 330 may also constantly or periodically monitor the status of the power grid 201.

Figure 3B:
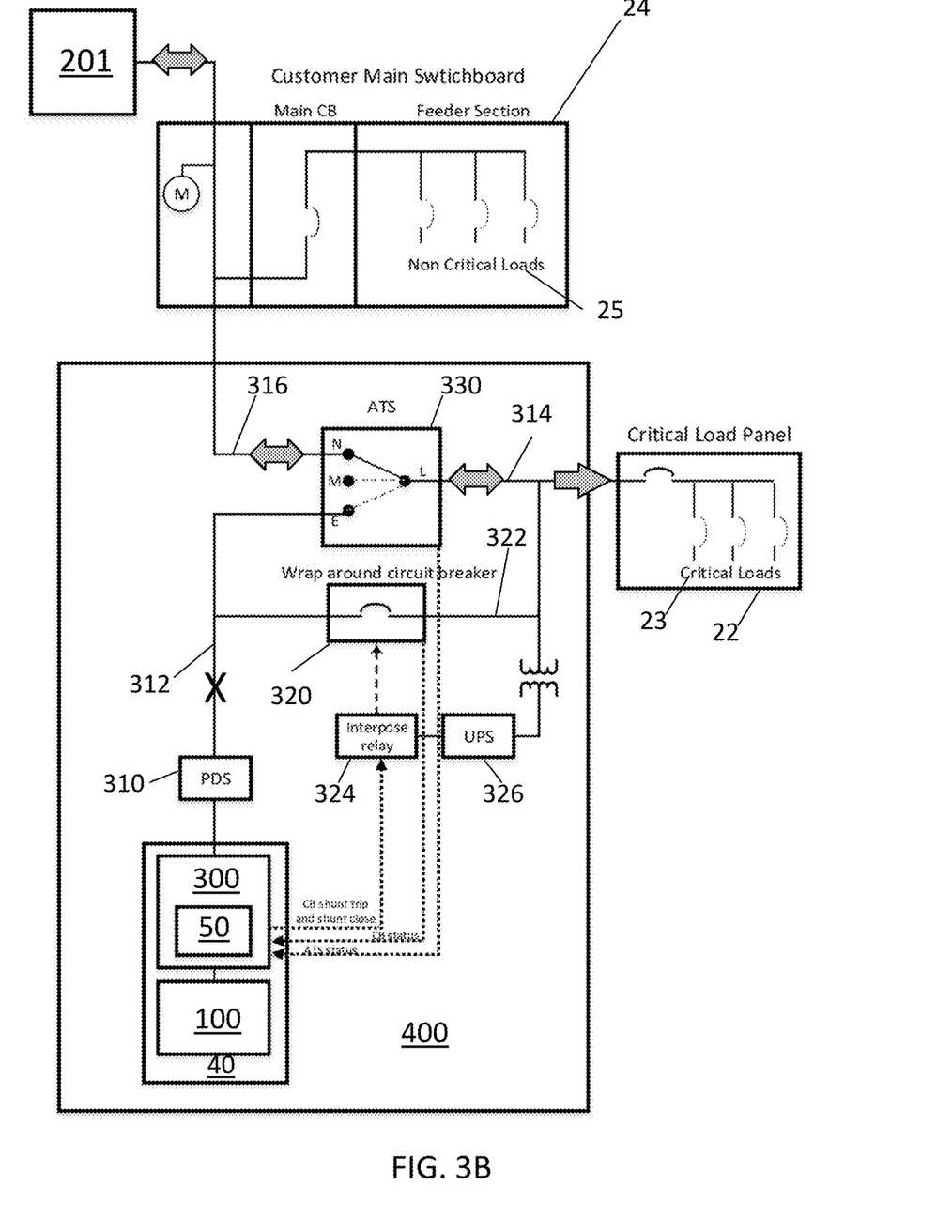
FIGS. 3B-3H are schematics showing power flow through the microgrid of FIG. 3A, as the microgrid transitions between grid parallel mode and island mode.

Referring to FIG. 3B, if the inverter module 300 detects a grid power non-compliance condition that the ATS 330 does not detect, the inverter module 300 stops exporting power to the system power line 312 and the power system 40 operates in a no load condition, while the ATS 330 remains in the normal position to supply grid power from the grid 201 to the critical loads 23. The inverter module 300 may continue to monitor the grid power through the closed circuit breaker 320, and if the inverter module 300 determines that the grid power is in compliance with power utility, IEEE 1547, and/or UL 1741 standards, the inverter module 300 may resume supplying fuel cell system power to the system power line 312.

Figure 3C:
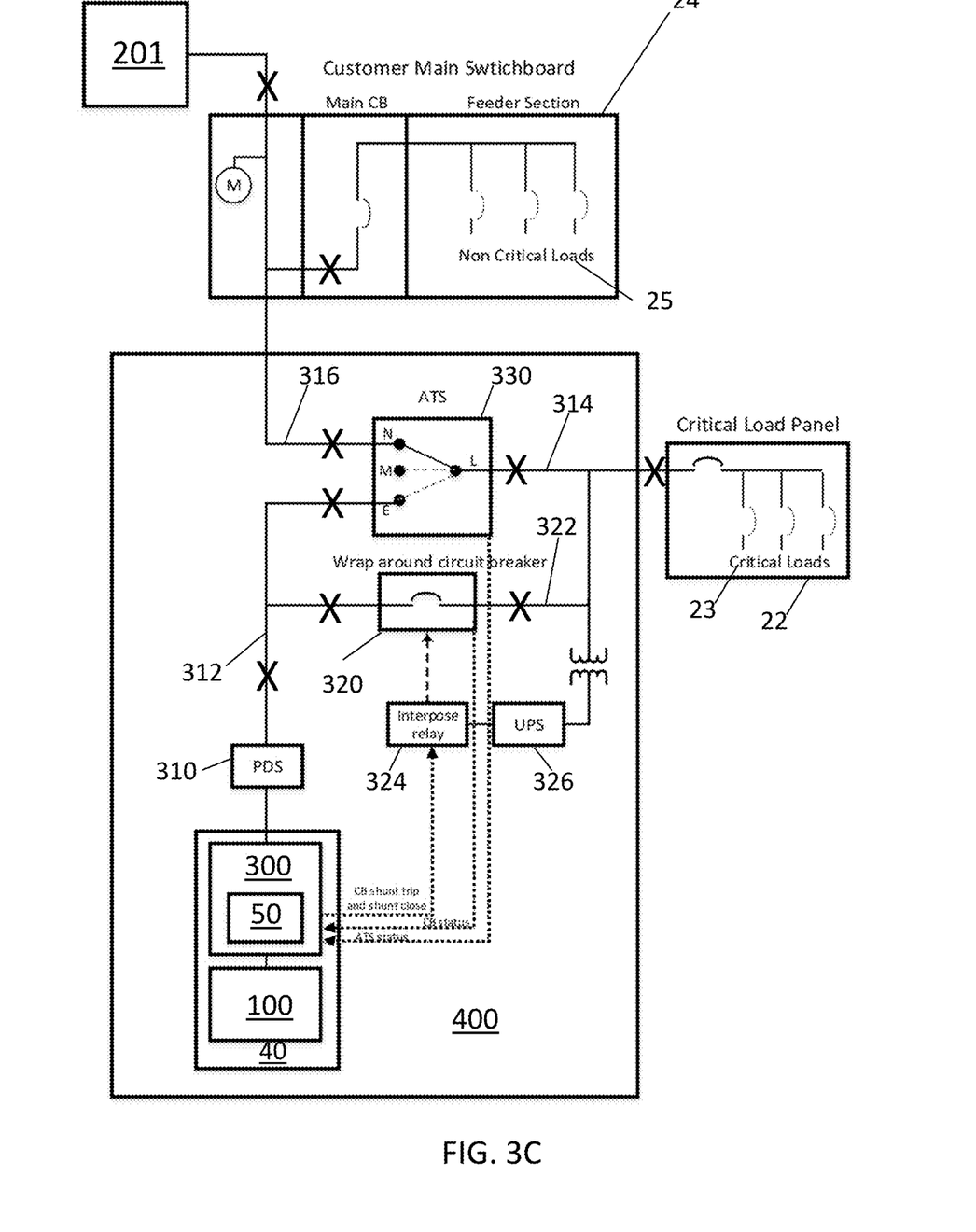
Figure 3D:
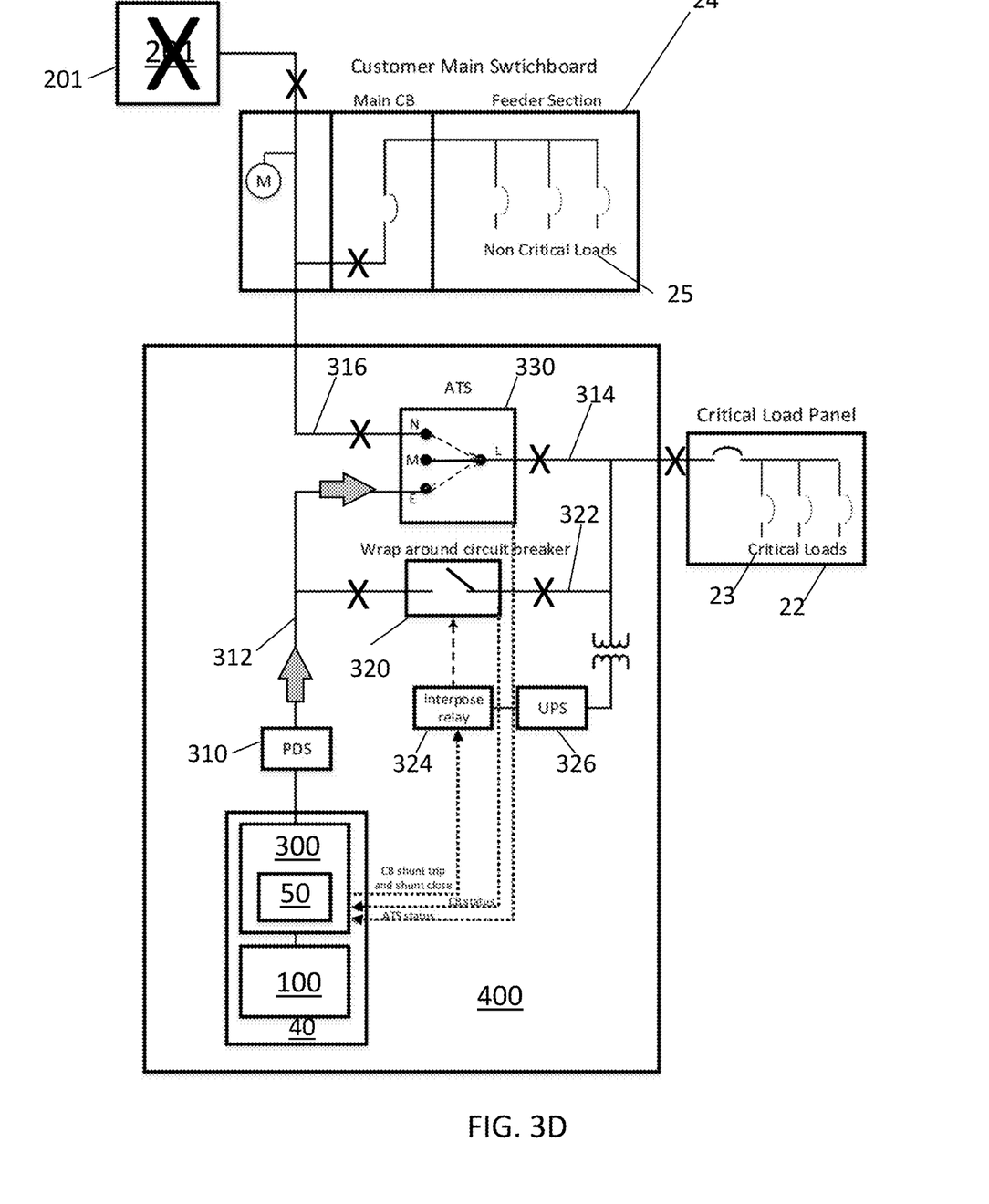
Figure 3E:
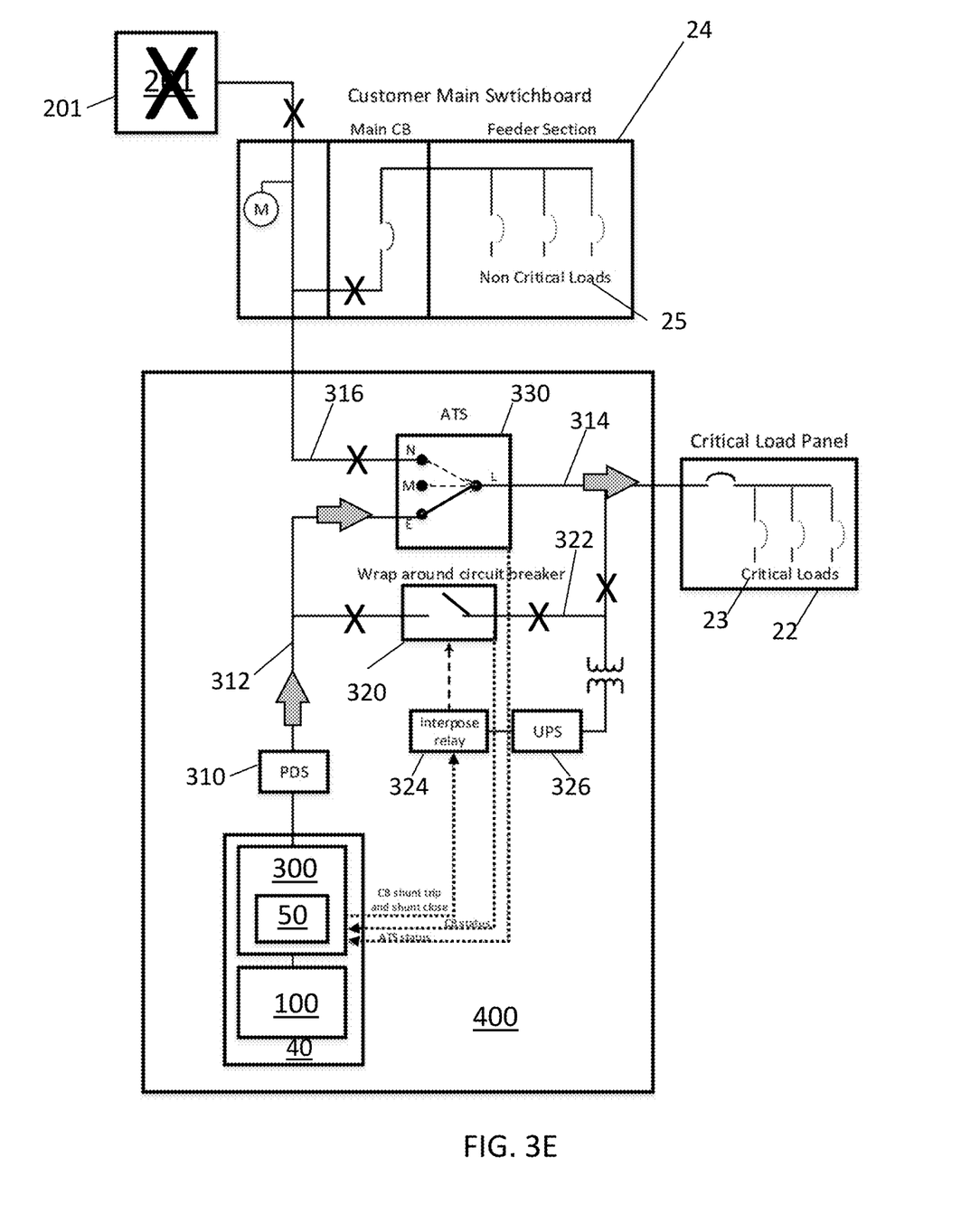

Referring to FIGS. 3C-3E, during an island transition mode of the microgrid 400, if the controller 50 (which monitors inverter module 300 and/or ATS 330 status) determines that the grid power is not suitable for interconnection, such as if the grid power from the grid 201 fails or is disrupted, the inverter module 300 stops power output to the system power line 312 and the power system 40 operates in a no load condition. The ATS 330 remains in the normal position and the circuit breaker 320 remains closed, as shown in FIG. 3C. Thus, the inverter module 300 functions as the primary anti-islanding protective device in accordance with utility, IEEE 1547 and/or UL 1741 limits, and shuts down (e.g., disconnects from the system power line at the PDS 310) as soon as the power grid (e.g., utility) 201 fails.

Referring to FIG. 3D, if the controller 50 of the inverter module 300 detects that grid power from the grid 201 is not available at the load terminal L of the ATS 330 (via path ATS status), and determines that there is no fault in the circuit breaker 320 (via path CB status), the inverter module 300 outputs a drive signal (via the third data path in FIG. 3D) to have the interpose relay 324 open the circuit breaker 320 using power from the UPS 322.

The controller 50 of the inverter module 300 may then confirm that the circuit breaker 320 is open by reading an auxiliary contact of the circuit breaker 320 via data path CB Status. After confirmation of the open circuit breaker 320, the power system 40 begins island mode, the PDS 310 is activated and the inverter module 300 outputs an island mode voltage, such as a 480V AC voltage, to the system power line 312 via the PDS 310. If the ATS 330 detects the island voltage, then the ATS 330 switches to its middle position M after a first delay period expires.

Referring to FIG. 3E, if the ATS 330 continues to detect the island voltage, the controller 50 controls the microgrid 400 to begin island mode operation. In particular, the controller 50 controls the ATS 330 (via path ATS Status) to switch the ATS 330 to its emergency position after a second delay period expires, to electrically connect the system power line 312 to the critical load line 314, by connecting the emergency terminal E and the load terminal L. As such, in island mode, the island mode voltage may be provided to the critical loads 23 of the critical load panel 22 from the power module 100 via the system power line 312, the ATS 330 and the critical load line 314. Accordingly, power from the power system 40 is supplied to the critical loads 23 and is not provided to the non-critical loads 25. The controller 50 of the inverter module 300 may constantly or periodically monitor the connection status of the ATS 330 during island mode operation.

Figure 3F:
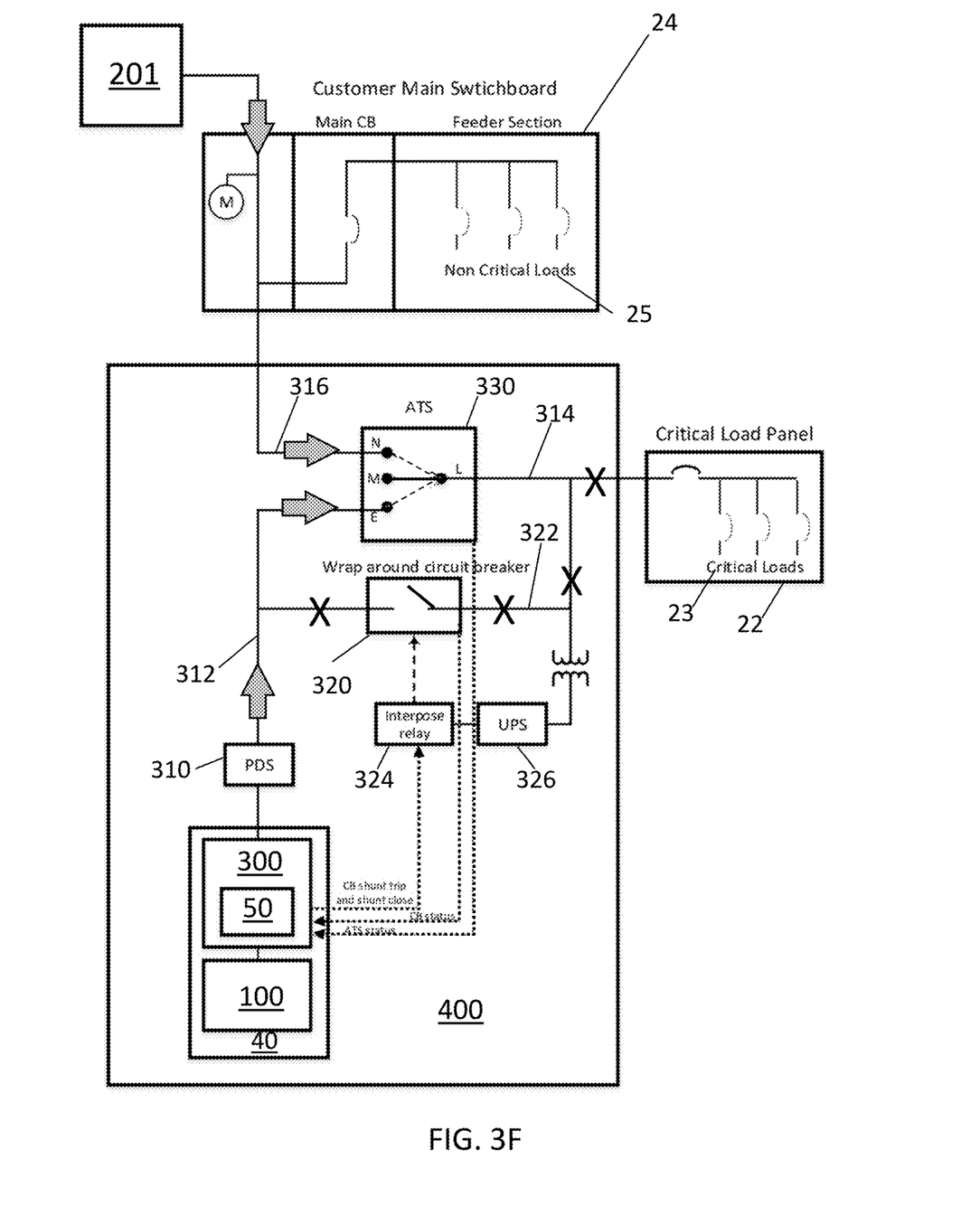
Figure 3G:
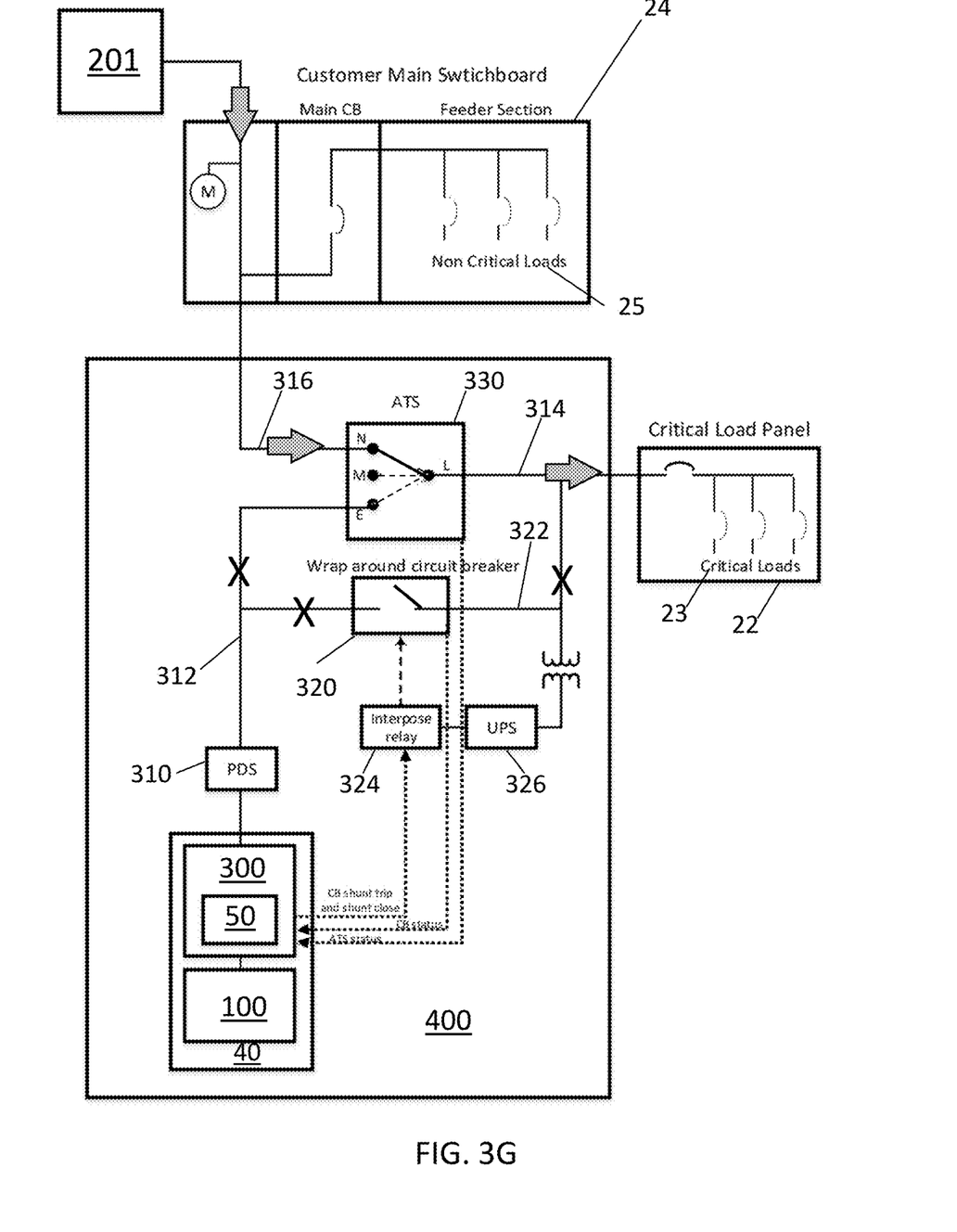
Figure 3H:
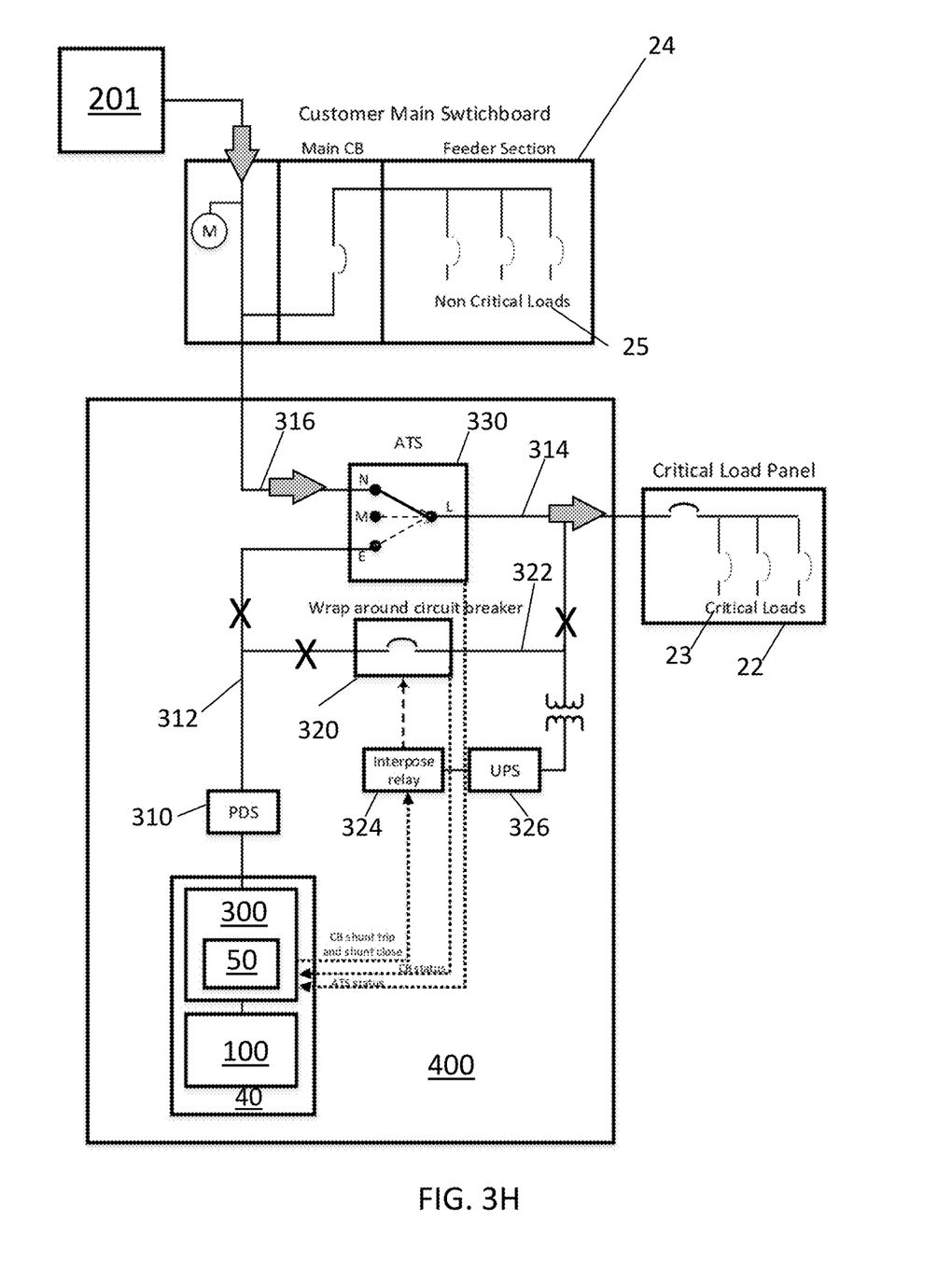

If the ATS 330 detects that the grid power has been restored (i.e., if the grid power is detected at the ATS 330 by the controller 50 via data path ATS Status) while the power system 40 is in island mode, then then microgrid 400 may begin a grid parallel transition mode, as shown in FIGS. 3F-3H. In particular, as shown in FIG. 3F, the controller may switch the ATS 330 to its middle position after a third delay period expires, such that no power is supplied to the critical loads 23. If the controller 50 of the inverter module 300 determines that the ATS 330 is in the middle position M, the power system 40 stops island mode operations (e.g., PDS 310 is opened and no power flows into the system power line 312 from the inverter module 300) and may begin transition mode operations. During transition mode operations, the power system 40 may ramp down regenerative loads such as motor loads and may stop outputting power to the system power line 312. The ATS 330 may remain in the middle position M for a fourth delay period.

As shown in FIG. 3G, after the fourth delay period expires, the controller 50 may then switch the ATS 330 to the normal terminal N to electrically connect the grid power line 316 to the load terminal L and provide grid power the critical loads 23. The inverter 300 may stop all power output to the system power line 312 during and/or after the fourth delay period. As such, the non-critical loads 25 and the critical loads 23 are supplied with grid power from the grid 201 through lines 316 and 314 and the ATS 330.

As shown in FIG. 3H, if the controller 50 of the inverter module 300 subsequently determines that the grid power is suitable for interconnection, then the controller 50 of the inverter module 300 sends a signal to close the circuit breaker 320. In particular, the controller 50 of the inverter module 300 closes the circuit breaker 320 if the controller 50 of the inverter module 300 detects that no voltage is applied to the system power line 312, the ATS 330 has electrically connected the normal terminal N to the load terminal L, grid power is available through the ATS 330, and there is no fault in the circuit breaker 320.

If the controller 50 of the inverter module 300 detects that the ATS 330 is in the normal position, the circuit breaker 320 is closed, and the grid power is suitable for interconnection, the controller 50 of the inverter module 300 controls the power system 40 to output a grid mode voltage to the system power line 312 via the PDS 310, and grid parallel mode operation of the power system 40 is resumed, as shown in FIG. 3B.

The embodiments of the invention provide hardware configurations and control methods to reliably support critical loads in a microgrid while allowing power export back to grid when grid is available. Specifically, one or more inverters are operated in grid parallel and island modes while being able to offset power to critical loads first and then also able to export excess power non-critical loads and then to the power grid when the grid is available, without requiring real time load management when switching between the grid parallel and island modes.

In one embodiment, the critical load(s), the non-critical load(s) and the grid are electrically connected through a standard ATS 330 and a wrap-around circuit breaker 320 which functions as an operable switch. The wrap around circuit breaker 320 is controlled to separate the grid and non-critical loads from microgrid with critical loads, or to allow excess power to non-critical loads and the grid. The load shed control may be eliminated while retaining voltage ride-through by using the circuit breaker 320 as an operable switch.

The construction and arrangements as shown in the various examples are illustrative only. Although only a few examples have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative examples. Other substitutions, modifications, changes, and omissions may also be made in the design, operating conditions and arrangement of the various examples without departing from the scope of the present disclosure. Any one or more features of any example may be used in any combination with any one or more other features of one or more other examples. It is intended that the specification and examples be considered as exemplary only, with a true scope being indicated by the following claims and their equivalents.

What is claimed is:

1. A microgrid, comprising:
   a power system configured to output system power;
   an automatic transfer switch (ATS) comprising:
      a normal terminal that is electrically connected to a grid power line configured to receive grid power from a power utility;
      an emergency terminal that is electrically connected to a system power line configured to receive system power from the power system; and
      a load terminal that is electrically connected to a critical load line configured to provide power to a critical load;
   a bypass line electrically connected to the system power line and the critical load line, so as to bypass the ATS; and
   a circuit breaker configured to control power flow through the bypass line.

2. The microgrid of claim 1, wherein when the microgrid is operating in a grid parallel mode, then the microgrid is configured to:
   provide the grid power to the critical load via the grid power line, the ATS, and the critical load line;
   close the circuit breaker; and
   provide the system power to the critical load via the bypass line.

3. The microgrid of claim 2, wherein when the microgrid is operating in the grid parallel mode, the microgrid is configured to provide system power in excess of a power requirement of the critical load to a non-critical load electrically connected to one of the grid power line or the power utility.

4. The microgrid of claim 1, wherein when the microgrid is operating in an island mode, then the microgrid is configured to:
   open the circuit breaker; and
   provide the system power to the critical load via the ATS.

5. The microgrid of claim 1, wherein the ATS is configured to:
   electrically connect the grid power line to the critical load power line, if the ATS determines that the grid power is suitable for interconnection; and
   electrically connect the system power line to the critical load power line, if the ATS determines that the grid power is not suitable for interconnection and the power system is providing the system power to the system power line.

6. The microgrid of claim 5, wherein the ATS is configured to electrically disconnect the load terminal from the normal terminal and the emergency terminal for a delay period, before electrically connecting the emergency terminal to the load terminal.

7. The microgrid of claim 6, wherein the ATS is configured to electrically reconnect the load terminal to the normal terminal, if the ATS determines that grid power suitable for interconnection is restored to the grid power line.

8. The microgrid of claim 1, wherein the power system is configured to open the circuit breaker if the power system determines that the grid power is not suitable for interconnection.

9. The microgrid of claim 8, wherein the power system is configured to close the circuit breaker if the power system determines that the grid power is suitable for interconnection.

10. The microgrid of claim 1, wherein the power system comprises:
a power module comprising a fuel cell stack; and
an inverter module containing a controller configured to control the system power output to the system power line and operation of the circuit breaker, based on at least one of a connection state of the ATS, a connection state of the circuit breaker, or a suitability of the grid power for interconnection.

11. A method of sequentially operating a microgrid in a grid parallel mode and in an island mode, comprising:
during the grid parallel mode:
providing grid power to a non-critical load via a grid power line electrically connected to the non-critical load, and to a critical load via the grid power line, a critical load line electrically connected to the critical load, and an automatic transfer switch (ATS) electrically connected to the grid power line and the critical load power line; and
providing system power generated by a power system to the critical load via a system power line, the critical load line, and a bypass line that is electrically connected to the system power line and the critical power line, in parallel to the ATS; and
during the island mode:
providing the system power to the critical load via the system power line, the ATS, and the critical load power line, such that the system power is not provided to the non-critical load.

12. The method of claim 11, wherein:
during the island mode, the ATS electrically connects the system power line to the critical load line, and a circuit breaker disposed on the bypass line is open, to prevent the system power from bypassing the ATS; and
during the grid parallel mode, the ATS electrically connects the grid power line to the critical load line, and the circuit breaker is closed such that the system power bypasses the ATS.

13. The method of claim 12, wherein the circuit breaker is opened if the grid power is not suitable for interconnection, and the circuit breaker is closed if the grid power is suitable for interconnection.

14. The method of claim 12, wherein during the grid parallel mode, system power in excess of a power requirement of the critical load is provided to at least one of the non-critical load or to a power utility electrically connected to the grid power line.

15. The method of claim 12, wherein during a transition mode that occurs between the grid parallel mode and the island mode, the system power is not output to the system power line, if the voltage or frequency of the grid power is determined to not be suitable for interconnection.

16. The method of claim 15, wherein during the transition mode, the circuit breaker is opened if the system power is not output to the system power line.

17. The method of claim 11, wherein:
the ATS electrically connects the grid power line to the critical load power line if the grid power is suitable for interconnection; and
ATS electrically connects the system power line to the critical load power line if the grid power is not suitable for interconnection and the power system is providing the system power to the system power line.

18. The method of claim 17, further comprising if the grid power is not suitable for interconnection, then the ATS electrically disconnects the critical load power line from the grid power line, before electrically connecting the system power line to the critical load power line.

19. The method of claim 18, further comprising if the grid power becomes suitable for interconnection is restored to the grid power line, then the ATS electrically reconnects the critical load power line to the grid power line.

20. The method of claim 12, wherein the power system comprises:
a power module comprising a fuel cell stack; and
an inverter module containing a controller configured to control the system power output to the system power line and operation of the circuit breaker, based on at least one of a connection state of the ATS, a connection state of the circuit breaker, or a suitability of the grid power for interconnection.

* * * * *